United States Patent [19]

Tsuchihashi

[11] Patent Number: 5,228,530
[45] Date of Patent: Jul. 20, 1993

[54] MUFFLER SYSTEM FOR AN ENGINE DISPOSED REARWARDLY OF A VEHICLE

[75] Inventor: Hironori Tsuchihashi, Sakai, Japan

[73] Assignee: Kubota Corporation, Osaka, Japan

[21] Appl. No.: 874,758

[22] Filed: Apr. 27, 1992

[30] Foreign Application Priority Data

Jul. 11, 1991 [JP] Japan .................................. 3-170769

[51] Int. Cl.⁵ ............................................ B60K 11/04
[52] U.S. Cl. .............................. 180/68.4; 180/69.22; 181/211; 181/283
[58] Field of Search .................... 180/68.1, 68.2, 68.4, 180/68.6, 291, 296, 69.22; 181/204, 211, 212, 227, 228, 240, 283

[56] References Cited

U.S. PATENT DOCUMENTS

| | | | |
|---|---|---|---|
| 2,940,249 | 6/1960 | Gospodar | 181/240 |
| 3,795,287 | 3/1974 | Rose | 181/283 |
| 4,265,332 | 5/1981 | Presnall et al. | 181/211 |
| 4,766,983 | 8/1988 | Tamba et al. | 181/240 |
| 4,828,017 | 5/1989 | Watanabe et al. | 180/68.6 |
| 5,029,668 | 7/1991 | Murakawa et al. | 181/240 |
| 5,078,223 | 1/1992 | Ishiwatari et al. | 180/68.4 |

FOREIGN PATENT DOCUMENTS 2293220 2/1990 Japan .

Primary Examiner—Richard M. Camby
Attorney, Agent, or Firm—Webb, Burden, Ziesenheim & Webb

[57] ABSTRACT

A lawn mower having a driver's seat mounted on a vehicle body, an engine mounted rearwardly of the driver's seat, a radiator and a radiator fan disposed between the driver's seat and engine, an engine hood for covering the engine and radiator, and a muffler disposed in a space defined by an upper rear surface of the engine and the engine hood. The hood includes a rear wall defining an exhaust grille, and the muffler has an exhaust outlet opening in a direction along cooling air flows from the radiator fan to the exhaust grille. The cooling air flowing rearwardly by action of the radiator fan passes through the radiator and flows out rearwardly of the vehicle body, carrying heat from upper positions of the engine and heat radiating from the muffler. The muffler releases exhaust gas to be entrained by the cooling air flows.

5 Claims, 3 Drawing Sheets

MUFFLER SYSTEM FOR AN ENGINE DISPOSED REARWARDLY OF A VEHICLE

BACKGROUND OF THE INVENTION

1. Field of the Invention

The present invention relates to a muffler structure for an engine disposed on a rear portion of a vehicle, particularly a lawn mower.

2. Description of the Related Art

A lawn mower, as disclosed in U.S. Pat. No. 5,029,668, for example, has a muffler disposed in front of and below an engine to direct exhaust gas obliquely downwardly in order to avoid withering or burning of lawn by exhaust heat from the muffler. This known muffler system further includes a cooling fan having a vertical rotary shaft and disposed above the engine to cause cooling air to flow downwardly. A cooling air guide curved along a lower surface of the muffler is required for deflecting the cooling air flows.

In a muffler system as disclosed in the Japanese patent application laid open under No. 1990-293330, a muffler is disposed adjacent the center of a front wall of an engine, and an exhaust pipe extends downwardly from the muffler and bent to a lateral position to open in a transverse direction of a vehicle body.

In these conventional muffler systems, the muffler has an exhaust outlet not directly pointing to the ground to avoid adverse influences on lawn of the exhaust heat from the muffler. However, since the exhaust outlet is located forwardly of a driver's seat with respect to a moving direction of the vehicle, the exhaust gas from the exhaust outlet is not positively prevented from reaching the driver.

Further, since the opening direction of the exhaust outlet is a primary consideration, the muffler is not sufficiently cooled by air flows generated by the cooling fan, or an additional guide duct is necessary for guiding the air flows to achieve sufficient cooling.

SUMMARY OF THE INVENTION

The object of the present invention is to provide a muffler system which minimizes adverse influences on environs, and which makes efficient use of cooling air flows generated by a cooling fan.

The above object is fulfilled, according to the present invention, by a lawn mower comprising a driver's seat mounted on a vehicle body; an engine mounted rearwardly of the driver's seat; a radiator and a radiator fan disposed between the driver's seat and the engine; an engine hood for covering the engine and the radiator; and a muffler disposed in a space defined by an upper rear surface of the engine and the engine hood. The hood includes a rear wall defining an exhaust grille, and the muffler has an exhaust outlet opening in a direction along cooling air flows from the radiator fan to the exhaust grille.

According to this construction, the cooling air flowing rearwardly by action of the radiator fan passes through the radiator and flows out rearwardly of the vehicle body, carrying heat from upper positions of the engine and heat radiating from the muffler. The muffler releases exhaust gas to be entrained by the cooling air flows. Thus, the mixed flows of heat and harmful exhaust gas are exhausted rearwardly of the exhaust grille. The muffler per se is sufficiently exposed to the cooling air flows generated by the fan, and exhaust gas flows do not affect the driver or patches of lawn.

Further, the cooling air flows generated by the cooling fan and moving substantially linearly through the interior of the hood has excellent sweeping action, thereby sufficiently suppressing atmospheric temperature inside the hood.

Thus, the present invention provides an improved motor section structure for a lawn mower having a rear-mount type engine, in which a well devised arrangement of the muffler is organically combined with the cooling air flows generated by the radiator fan, to avoid adverse influences of exhaust heat on the lawn and on the driver. This is achieved while suppressing a temperature rise in the engine hood.

Other features and advantages of the present invention will be apparent from the following description of a preferred embodiment taken with reference to the drawings.

DETAILED DESCRIPTION OF THE PREFERRED EMBODIMENT

An embodiment of the present invention will be described with reference to the drawings.

Figure 1:
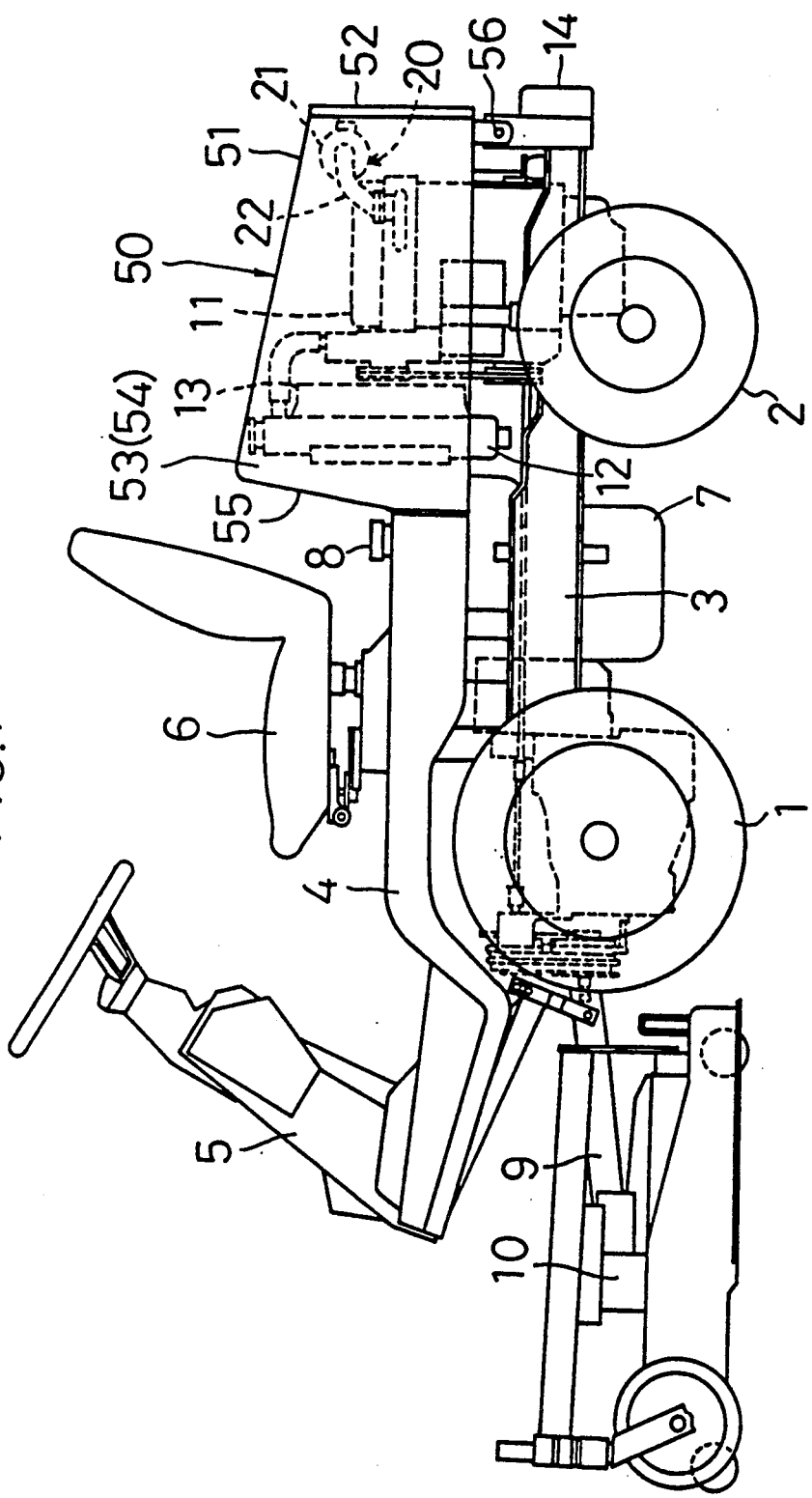
FIG. 1 is a side elevation of a lawn mower according to the present invention.

FIG. 1 shows a front mower type riding garden tractor. This tractor has front drive wheels 1, dirigible rear wheels 2, and a body frame 3 supported by the front and rear wheels 1 and 2. A floor panel 4 is mounted on a forward portion of the body frame 3. The floor panel 4 has a steering column 5 erected on a front end thereof, and a driver's seat 6 disposed rearwardly thereof. A battery 7 and a fuel tank 8 are mounted below the driver's seat 6 and between the front wheels 1 and rear wheels 2. The body frame 3 carries, in forward positions thereof, a transmission and an axle case for driving the front wheels 1, and a mower unit 10 suspended through oscillatable arms 9.

An engine 11 is mounted on a rear portion of the body frame 3, with a radiator 12 interposed between the engine 11 and driver's seat 6. A radiator cooling fan 13 is mounted rearwardly of the radiator 12. The cooling fan 13 has a rotary shaft extending longitudinally of the tractor. The body frame 3 carries a weight 14 attached to a rear end thereof for maintaining stability of the tractor. The engine 11 and radiator 12 are covered by an engine hood 50 pivotable about a horizontal pivotal axis 56 disposed above the weight 14. The hood 50 has an upper wall 51, a rear wall 52, side walls 53, 54, and a front wall 55. An upper half of the engine 11, the radiator 12 and the cooling fan 13 are completely enclosed in the hood 50. The upper wall 51 of the hood 50 slopes down rearwardly to avoid stagnation of air in the hood 50.

Figure 2:
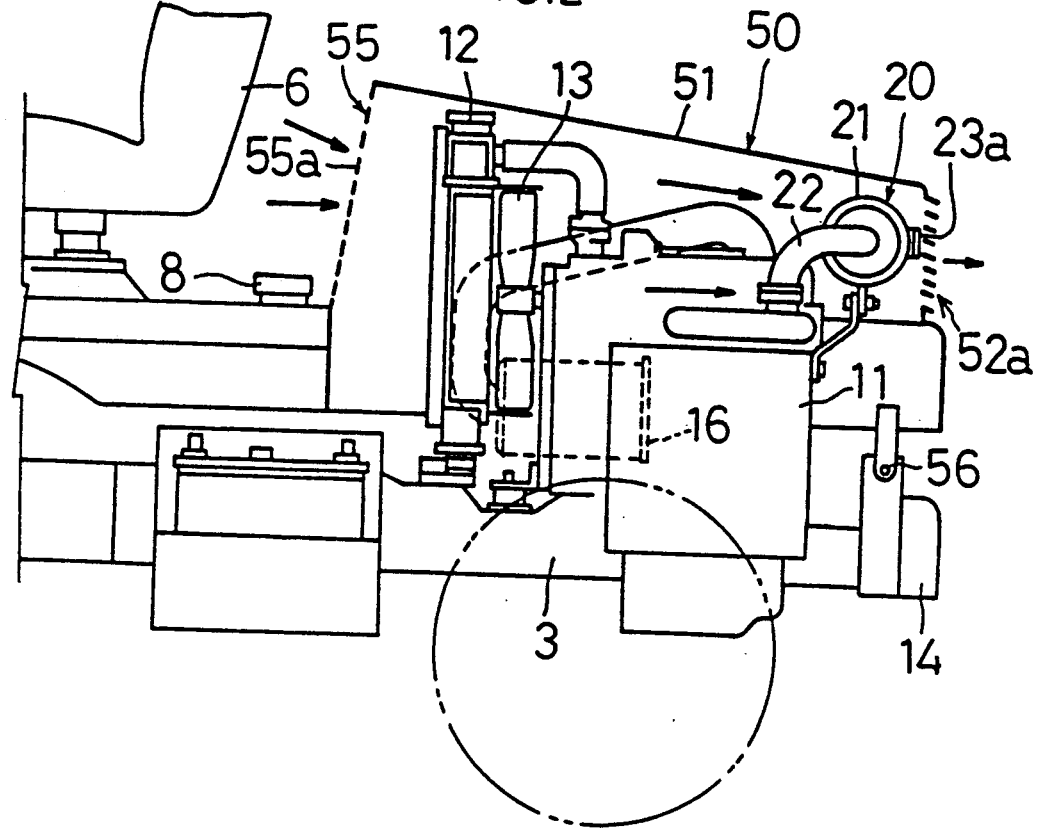
FIG. 2 is a side view of a motor section disposed on a rear portion of the lawn mower.
Figure 3:
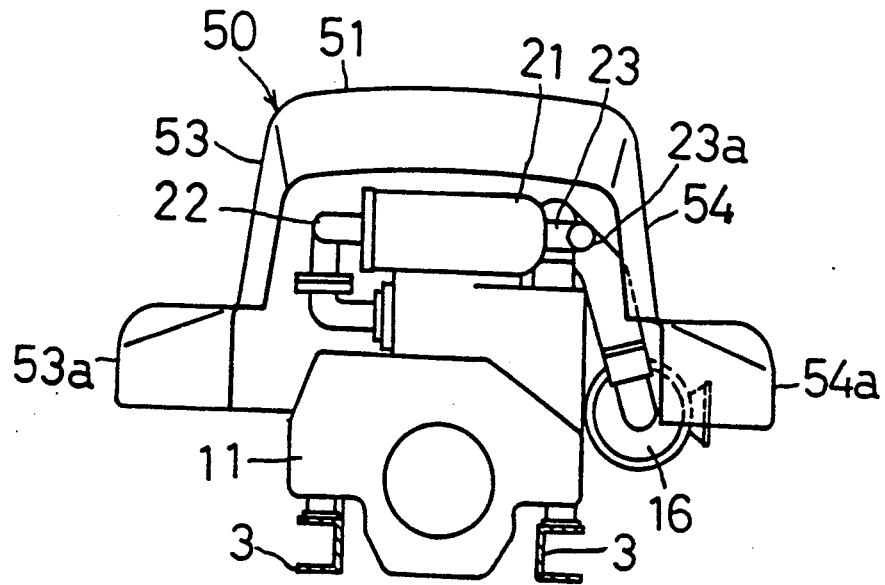
FIG. 3 is a rear view of the motor section with a rear wall of an engine hood omitted for expediency of illustration.

As seen from FIGS. 2 and 3, a muffler system 20 is disposed rearwardly of the engine 11 and opposed to an exhaust grille 52a formed in an upper portion of the rear wall 52 of the hood 50. The muffler system 20 includes a muffler body 21 having a cylindrical shape, a connecting pipe 22 connecting the muffler body 21 to an exhaust manifold of the engine 11, and an exhaust pipe 23 extending from the muffler body 21. The muffler body 21 has an axis extending horizontally and transversely of the tractor, and is in its entirety located above the upper surface of the engine 11. The exhaust pipe 23 extends from an end face of the muffler body 21, and is bent approximately 90 degrees before entering the exhaust grille 52a. Thus, the exhaust pipe 23 has an exhaust outlet 23a opening in a direction along cooling air flows generated by the cooling fan 13 and exhausted through the exhaust grille 52a.

As shown in FIG. 3, the side walls 53, 54 of the hood 50 are disposed close to the engine 11 in order to improve efficiency of cooling air flows to the muffler body 21. With the hood 50 in a closed position, the upper surface of the engine 11 and the upper wall 51 and left and right side walls 53, 54 of the hood 50 define a cooling air duct extending from an upper region of the cooling fan 13 to the exhaust grille 52a by way of the muffler body 21. Lower portions of the side walls 53, 54 of the hood 50 project laterally outwardly, whereby heat from lower positions of the engine 11 is collected to upper center regions where strong cooling air flows are formed. An air cleaner 16 is disposed in one of the projecting side wall portions.

Reference 55a denotes an intake grille formed in the front wall 55 of the hood 50 for supplying air to the cooling fan 13. Thus, when the cooling fan 13 is driven, cooling air flows in through the intake grille 55a and cools the radiator 4, engine 11 and muffler body 21 in this order. Subsequently, the cooling air is exhausted confluently with exhaust gas rearwardly through the exhaust grill 23a.

Figure 4:
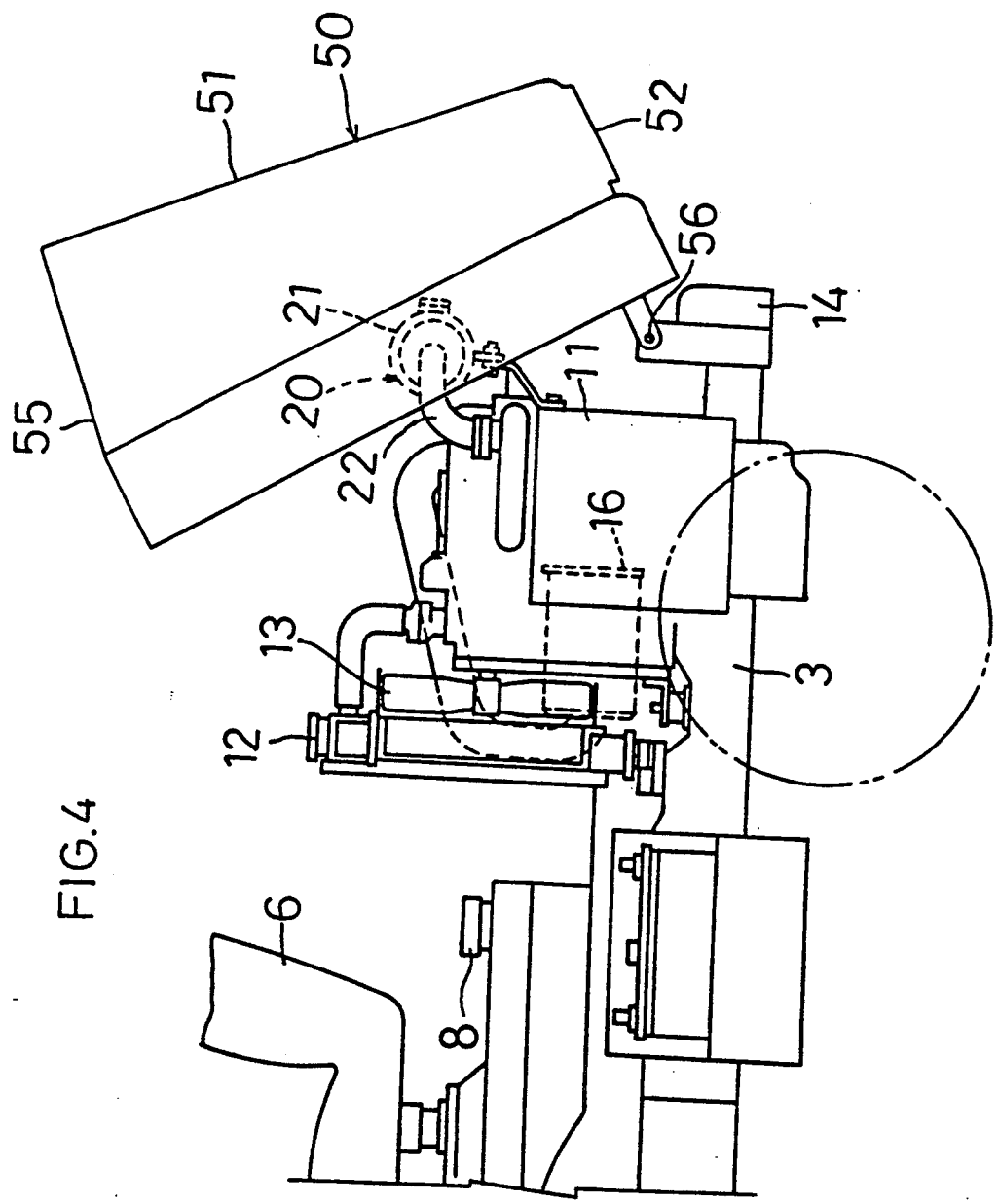
FIG. 4 is a side view of the motor section with the engine hood opened.

FIG. 4 shows the engine hood 50 having pivoted about the pivotal axis 56 to an open position to expose an engine room. As seen from this drawing, when the hood 50 is opened, opposite sides of the muffler body 21 are covered by the side walls 53, 54 of the hood 50. This is effective to keep an inspecting person from inadvertently touching the muffler body 21.

What is claimed is:

1. A lawn mower comprising:
   a driver's seat mounted on a vehicle body;
   an engine mounted rearwardly of said driver's seat;
   a radiator and a radiator fan disposed between said driver's seat and said engine;
   an engine hood for covering said engine and said radiator, said engine hood including an upper wall, right and left side walls and a rear wall, said rear wall defining an exhaust grille; and
   a muffler having an inlet connected to an exhaust manifold of said engine, and an exhaust outlet, said muffler being disposed in a space defined by an upper rear surface of said engine and said rear wall of said engine hood;
   said exhaust outlet of said muffler opening in a direction along cooling air flows from said radiator fan to said exhaust grille.

2. A lawn mower as claimed in claim 1, wherein part of said radiator fan and substantially an entirety of said muffler are located above an upper surface of said engine.

3. A lawn mower as claimed in claim 2, wherein said upper surface of said engine and said upper wall and said right and left side walls of said engine hood define a cooling air duct extending from an upper region of said radiator fan to said exhaust grille by way of said muffler.

4. A lawn mower as claimed in claim 3, wherein said muffler has a main body shaped substantially cylindrical with an axis thereof extending approximately transversely of said vehicle body.

5. A lawn mower as claimed in claim 1, wherein said exhaust outlet of said muffler is projecting from said exhaust grille.

* * * * *